April 4, 1939.  A. ALLTIMES  2,153,067
CUTTING AND EMBOSSING DEVICE FOR BISCUIT MACHINES
Filed April 14, 1938   2 Sheets-Sheet 1

INVENTOR
Alfred Alltimes
by Fred W. McArdle
atty

April 4, 1939.  A. ALLTIMES  2,153,067
CUTTING AND EMBOSSING DEVICE FOR BISCUIT MACHINES
Filed April 14, 1938  2 Sheets-Sheet 2

INVENTOR
Alfred Alltimes
by Fred W McArdle
Att'y

Patented Apr. 4, 1939

2,153,067

UNITED STATES PATENT OFFICE 2,153,067

CUTTING AND EMBOSSING DEVICE FOR BISCUIT MACHINES

Alfred Alltimes, Medford, Mass.

Application April 14, 1938, Serial No. 202,005

7 Claims. (Cl. 107—26)

My invention relates to machines for cutting and embossing sheet dough, and particularly to devices attachable to the crossheads of such machines which are adapted to emboss and cut a variety of forms and designs from a sheet of dough moving through the machine.

In my U. S. Patent Number 1,650,682, issued November 29, 1927, I disclosed and claimed features in a device of this character in which the dough sheet was embossed by a plurality of embossing elements, and the embossed areas cut from the sheet in the succeeding cycle of movement of the machine, the dough sheet being advanced to a position in which the cutting elements would function, the embossing elements simultaneously embossing new areas for cutting in the succeeding cycle.

While this device produced a finished product, I found it necessary to adjust the device on the crosshead of the machine in accurate relation to the line of travel of the dough sheet.

If this was not done and the cutting elements and embossing elements were not in alignment with the line of travel of the sheet, the contours of the cut sections were not symmetrical with the previous embossing. As there are a plurality of both embossing and cutting elements operating at each cycle of the machine, the appearance of these biscuit detracted from the commercial value of a high grade product if allowed to mix with perfect goods.

In my present invention, in addition to other improvements, I have overcome this difficulty, and the device may be attached to the crosshead of the machine with facility and with ordinary care, and a uniform product will result, with the embossed surface of each biscuit symmetrical with the respective contour.

One object of my present invention is to provide an attachment attachable to the crosshead of a biscuit cutting or embossing machine, by means of which a sheet of dough may be embossed and the embossed areas cut in the same cycle of operation of the machine.

A second object is to provide a device of this character which may be attached to the cross head of the machine with facility and produce goods in which the embossed surfaces are symmetrical with the contour of the cut product, and the embossing is uniform in character and appearance with any predetermined thickness of dough within predetermined limits.

A further object is to utilize the embossing head as a stripper for the respective cut section.

Other objects and advantages will appear in the accompanying specification and claims and in the drawings forming a part thereof.

To accomplish these objects, I combine the embossing element and the cutting element in manner hereinafter described.

These are mounted in plurality in a unit which is applicable to existing cutting or embossing machines for dough sheets, replacing other devices which are attached to the crosshead of the particular machine.

My invention consists in the novel combination of embossing and cutting elements, and their construction and operation, together with other features will appear in the specification and drawings.

Figure 2:
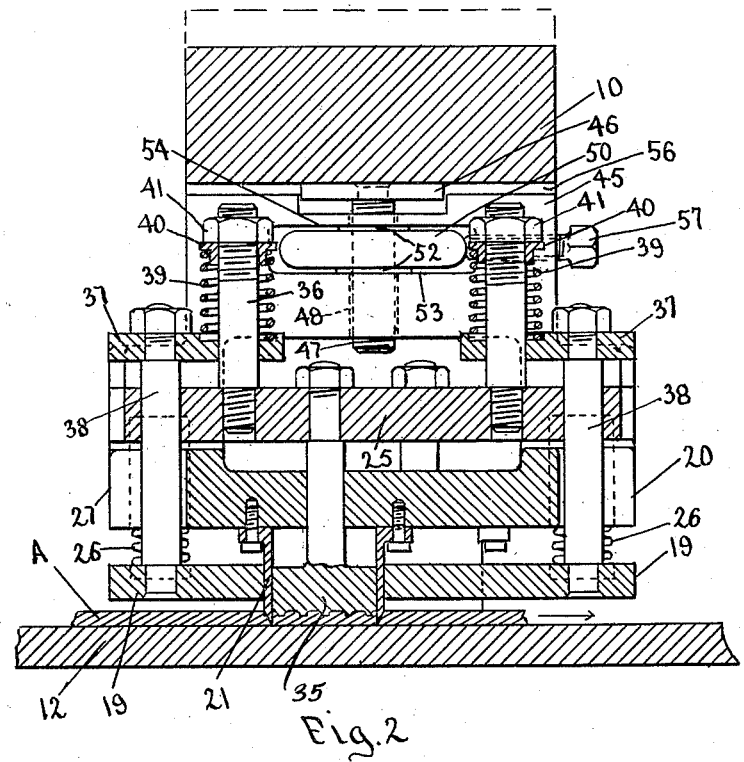
Fig. 2 is an enlarged cross section of my device, substantially on the line 2—2 Fig. 4, showing the device in the cutting and embossing position of the parts.
Figure 1:
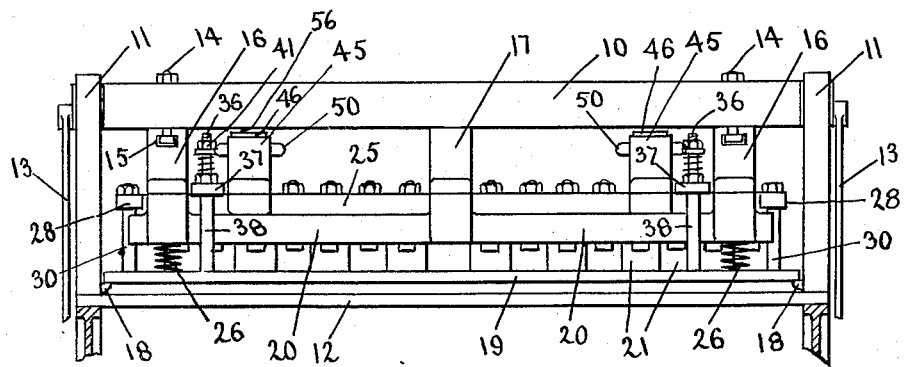
Fig. 1 is an elevation showing a preferred embodiment of my invention, as attached to the crosshead of a biscuit embossing or cutting machine.
Figure 4:
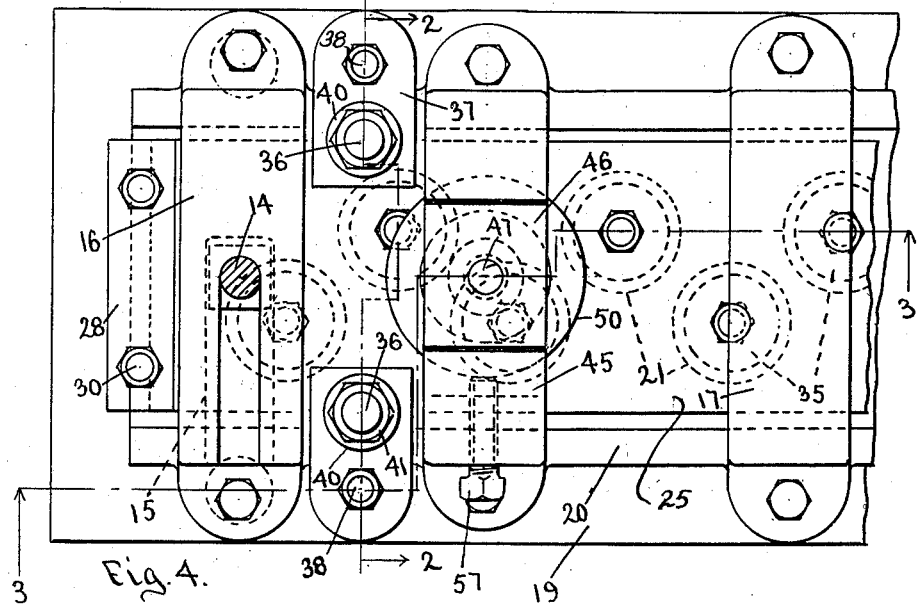
Fig. 4 is a corresponding plan in which the crosshead of the machine is omitted.
Figure 3:
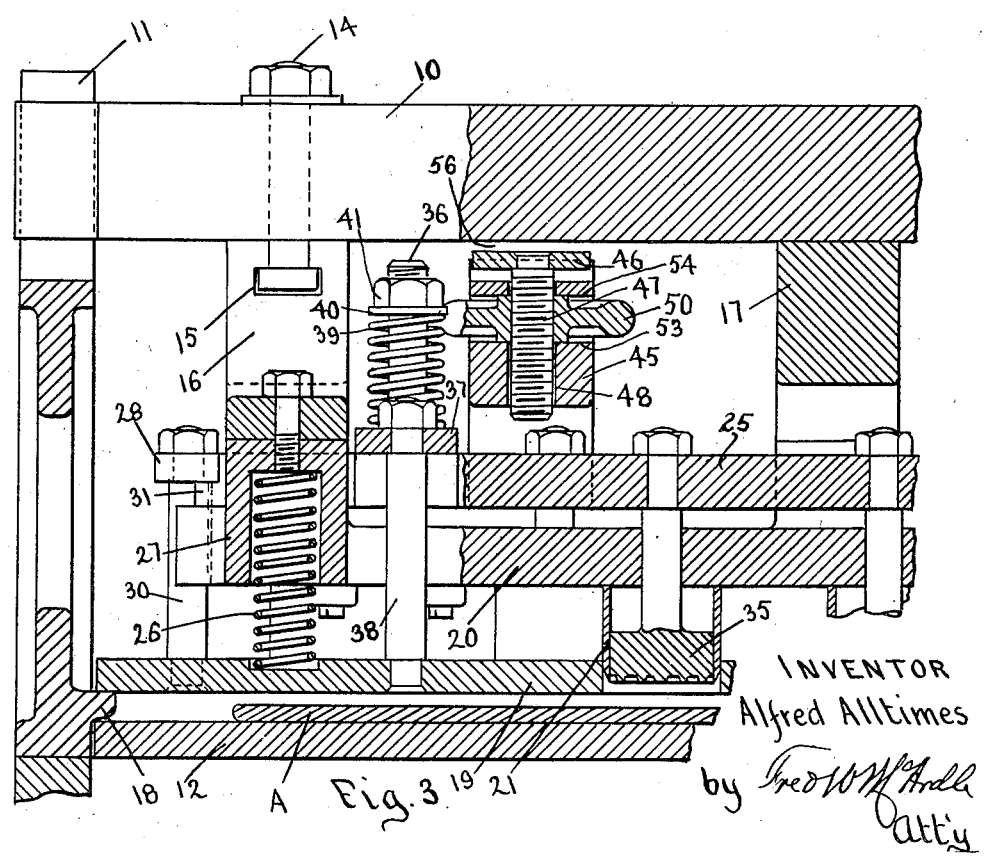
Fig. 3 is a longitudinal section substantially on the line 3—3 Fig. 4, of my device, showing a portion in relation to the apron and one side frame of the machine.

Referring to the drawings, the crosshead of the machine, 10, is reciprocated to and from the apron 12, the ends being guided in the standards 11 of the machine frame. Means for such reciprocation are indicated by the pitmans 13, Fig. 1.

The device is secured to the crosshead 10 by bolts 14 passing through the crosshead and engaging slots 15, in the arches 16 forming a part of the device. These arches project upwardly from the device, adjacent to each end, and a similar arch 17 without necessarily an attaching bolt, projects upwardly midway between and serves as a strut by engaging the under side of the crosshead.

The device as a whole, bridges the sheet of dough A as it moves over the apron 12, and is limited in its downward movement, by abutments 18, projecting from the side frames of the machine, the stripper plate 19 engaging therewith leaving ample space for the dough to move over the apron.

The several arches are secured to a base plate 20, to the under side of which are secured a plurality of cutting elements 21, slidable through the stripper plate 19.

The base plate is yieldingly supported in predetermined parallel relation to the stripper plate, on springs 26, socketed in bosses 27 formed integral with the base plate, the arches 16 being secured to the respective upper surfaces thereof. These springs react on the stripper plate 19 to retain the base plate in withdrawn position from the stripper plate 19. Projecting upwardly from the stripper plate 19 are pairs of posts 30, each pair being connected by a plate 28. These plates are adapted to engage shelves 31 formed at opposite ends of the follower plate 25. When the device is in raised position this plate bears on the base plate 20, and the action of the springs 26 presses the two plates upwardly against the under sides of the plates 28. The follower plate is however independently movable relative to the base plate, and is of itself yieldingly pressed upwardly against the plates 28 as follows: Projecting upwardly from the stripper plate are studs 38 to the upper end of which are secured the plates 37. These studs are arranged adjacent to the arches 16 on each side of the base and stripper plates. Projecting upwardly from the follower plate 25, and slidable in the plates 37, are studs 36 which function as arbors for the springs 39 bearing on the plates 37 and reacting on the adjustment nuts 40 by means of which the tension may be regulated, check nuts 41 securing them in adjusted position. By this means the follower plate is yieldingly pressed upward against the plates 28.

As the action of the springs 26 is on the base plate upwardly, the upward movement of both base and follower plates is limited by the same members, the plates 28.

Rigid with the follower plate 25 and slidable within respective cutting elements 21, are embossing elements 35, and it will be obvious that as the base plate is directly actuated from the cross head of the machine, and the follower plate yieldingly retained against the under sides of the plates 28, that there will be a relative axial movement of the cutting and embossing elements when the machine is operated to engage the stripper plate with the abutments 18, the springs 26 being compressed as the base plate carrying the cutting elements continues its movement to cut the dough sheet, and the follower plate being retained against the plates 28, supported from the stripper plate. Under these conditions without other actuating means, the embossing elements would not function, and I provide means whereby any thickness of dough within the capacity of the machine may be embossed and the cut section stripped from the cutter elements by the action of the respective embossing elements.

I have shown and will now describe one means for accomplishing the above object. Secured to the follower plate adjacent to the arches 16 are the arches 45, extending upwardly toward but not engaging the crosshead, clearing the crosshead by a distance in excess of the maximum variation in thickness of dough provided for. Movably mounted in each arch is a plate 46, integral with which is the stud 47, extending downwardly into the arch, the stud loosely fitting the opening 48 therein. The stud is threaded to engage a correspondingly threaded hand wheel 50 rotatable in an opening through the arch 45, hubs 52 of the wheel bearing on opposite sides 53, 54 of the opening 52. The hand wheel 50 is rotated to raise or lower the plate 46 through its action on the stud 47, varying the distance 56 through which the crosshead will move before engagement therewith, the base plate and cutting elements advancing beyond the embossing elements by this adjusted difference, and determining the depth of the embossing on the dough sheet. The set screw 57 engaging the periphery of the hand wheel, retains the parts in adjusted position. It will thus be evident that if the plates 46 are adjusted upwardly, the relative difference in movement of the cutting and embossing elements will be reduced and a thin biscuit is embossed as may be required, and by widening the space 56 by adjusting the plates 46 downwardly, a thicker sheet may be embossed to the same depth or greater or less depth. The operation of the device is as follows: The device being attached to the crosshead and operation started, the crosshead descends carrying the device, and when the stripper plate 19 engages the bosses 18, the cutting elements are moved downwardly compressing the springs 26, the embossing elements secured to the follower plate 25, remaining at rest, yieldingly retained against the plates 28, until the crosshead engages the plates 46, adjusted to emboss the particular dough sheet. The cutting elements and the embossing elements now move downward to cut and emboss in one operation.

As the crosshead rises, the reverse action takes place, and the embossing surface which is set to the level of the cutter edges when in withdrawn position, operates to strip the cut section from the cutter elements, and the stripper plate operates in like manner to strip the scrap and advancing dough sheet. I do not confine myself to the disclosures in the embodiment of my invention described and illustrated, as modifications may be made in the construction and operation within the scope of the appended claims.

Having thus described my invention, I claim:

1. In a cutting and embossing device having supporting means attachable to the crosshead of a biscuit machine, a plurality of cutting elements secured thereto, and embossing elements mounted therein and relatively movable in alignment therewith, means engageable with the crosshead for operating the embossing elements relative to the cutting elements to emboss and cut a sheet of dough simultaneously; and to strip the cut sections from the cutting elements.

2. In a cutting and embossing device of the character described in claim 1, means engageable with the crosshead for varying the relative movement of the embossing and cutting elements.

3. In a cutting and embossing device of the character described in claim 1, means engageable with the crosshead for adjusting the movement of the embossing elements relative to the cutting elements, to cut and emboss uniformly, sections from dough sheets of different thicknesses.

4. In a cutting and embossing device having a base plate, cutting elements secured thereto, means for securing the plate to the crosshead of a biscuit machine, a follower plate yieldingly supported relative to the base plate, embossing elements secured thereto and relatively movable in alignment within respective cutter elements, and a stripper plate in parallel and yielding relation to the base plate, and through which the cutter elements are movable, means for limiting the relative movement of the embossing and cutting elements, means mounted on the follower plate for adjusting said movement to cut and emboss uniformly sections from different thicknesses of dough sheets.

5. In a cutting and embossing device of the character described in claim 4, the adjusting means including supports rigid with the follower plate; members movably mounted therein and adapted to be engaged by the crosshead and thereafter moved in unison with the base plate, and means for adjusting the members toward and from the crosshead to vary the amplitude of the relative movement of the follower and base plates and respective cutters and embossing elements.

6. In a cutting and embossing device of the character described in claim 4, the adjusting means including supports rigid with the follower plate; plate elements movably mounted in respective supports; a threaded stud integral with each plate and axially movable in the support; an element threaded to engage each stud and bearing in the support and rotatable to move the respective plate toward and from the crosshead to engage therewith and move the follower plate and embossing elements in determined relation to the cutting movement of the base plate and respective cutter elements.

7. In a cutting and embossing device of the character described in claim 4, the means for limiting the relative movement of the cutter and embossing elements including elements supported in fixed relation to the stripper plate, and adapted to engage the follower plate; supports rigid with the stripper plate and overhanging the follower plate; studs slidable in said supports and rigid with the follower plate; springs arbored on the studs and bearing on the supports and reacting on elements threaded to engage the studs to retain the follower plates and embossing elements yieldingly in raised position; springs reacting on the base and stripper plates whereby they are pressed apart as the crosshead rises, and the follower plate engaged with the base plate, the cutter and respective embossing elements being relatively operated to strip the cut sections and scrap dough from the cutter elements.

ALFRED ALLTIMES.